(12) United States Patent
Yegnashankaran et al.

(10) Patent No.: US 7,764,517 B2
(45) Date of Patent: Jul. 27, 2010

(54) POWER SUPPLY WITH REDUCED POWER CONSUMPTION WHEN A LOAD IS DISCONNECTED FROM THE POWER SUPPLY

(75) Inventors: Visvamohan Yegnashankaran, Cupertino, CA (US); Peter J. Hopper, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 154 days.

(21) Appl. No.: 11/982,633

(22) Filed: Nov. 2, 2007

(65) Prior Publication Data

US 2009/0116269 A1    May 7, 2009

(51) Int. Cl.
    *H02M 3/335*    (2006.01)
(52) U.S. Cl. .................................. 363/21.08
(58) Field of Classification Search .............. 363/21.08, 363/21.07, 21.04
    See application file for complete search history.

(56) References Cited

U.S. PATENT DOCUMENTS

| 4,660,136 | A | * | 4/1987 | Montorefano | ................ | 363/26 |
| 4,677,534 | A | * | 6/1987 | Okochi | .................... | 363/21.11 |
| 5,862,045 | A | * | 1/1999 | Halamik et al. | ............... | 363/97 |
| 5,955,797 | A |   | 9/1999 | Kim | ........................... | 307/150 |
| 5,991,172 | A | * | 11/1999 | Jovanovic et al. | ........ | 363/21.14 |
| 6,501,195 | B1 |  | 12/2002 | Barton | ....................... | 307/125 |
| 6,518,730 | B2 |  | 2/2003 | Nakagawa et al. | .......... | 320/136 |
| 6,528,902 | B1 |  | 3/2003 | Barton | ........................ | 307/39 |
| 6,759,762 | B2 |  | 7/2004 | Barton | ........................ | 307/39 |
| 6,759,763 | B2 |  | 7/2004 | Barton | ........................ | 307/39 |
| 6,975,521 | B1 | * | 12/2005 | Konno | ..................... | 363/21.08 |
| 7,023,180 | B2 |  | 4/2006 | Nagai et al. | ................. | 320/162 |
| 7,130,201 | B2 | * | 10/2006 | Yao | .......................... | 363/21.04 |
| 7,206,944 | B2 |  | 4/2007 | Odaohhara et al. | ......... | 713/300 |
| 7,218,532 | B2 | * | 5/2007 | Choi et al. | ............... | 363/21.01 |
| 7,511,973 | B2 | * | 3/2009 | Kesterson et al. | ........ | 363/21.01 |

OTHER PUBLICATIONS

"Smart Strip Power w/ Fax & Modem Protection—LCG4—SmartHomeUSA.com", [online], [retrieved on Aug. 3, 2007]. Retrieved from the Internet: <URL:http://www.smarthomeusa.com/Shop/Bits-Ltd./Item/LCG4/>. pp. 1-5.
Collin Dunn, "Smart" Power Strips: Helping to Stop Idle Current Now! (Tree Hugger), [online], [retrieved on Aug. 6, 2007]. Retrieved from the Internet: <URL:http://www.treehugger.com/files/2005/12/smart_power_str.php>. pp. 1-7.
"8 Outlet Power Strip with Personal Sensor", User Reference Guide, [online], [retrieved on Aug. 6, 2007]. Retrieved from the Internet: <Url:http://www.wattstopper.com/getdoc/1360.pdf>. pp. 1-2 (unnumbered).

* cited by examiner

*Primary Examiner*—Shawn Riley
(74) *Attorney, Agent, or Firm*—Mark C. Pickering

(57) ABSTRACT

Detection and control circuitry are added to a conventional power supply to detect when a load, such as a portable electronic device, has been disconnected from the power supply and, when disconnected, interrupt a current path to the primary windings of a transformer within the power supply to substantially reduce the amount of reactive power that is consumed by the power supply.

20 Claims, 4 Drawing Sheets

POWER SUPPLY WITH REDUCED POWER CONSUMPTION WHEN A LOAD IS DISCONNECTED FROM THE POWER SUPPLY

BACKGROUND OF THE INVENTION

1. Field of the Invention

The present invention relates to power supplies and, more particularly, to a power supply with reduced power consumption when a load is disconnected from the power supply.

2. Description of the Related Art

Battery chargers commonly accompany portable electronic devices, such as cell phones, laptops, and MP3 players. A battery charger is a power supply that converts the voltage on an AC input, such as a standard AC wall plug, into a DC output voltage. The DC output voltage generated by the power supply is then provided to the portable electronic device to charge the battery, power the device, or both. Two well-known power supplies are a linear power supply and a switched-mode power supply (SMPS).

FIG. 1 shows a circuit diagram that illustrates an example of a prior-art linear power supply 100. As shown in FIG. 1, linear power supply 100 includes an AC input 110 that receives a low-frequency AC (60 Hz), and a low-frequency transformer 112 that has primary windings 112A and secondary windings 112B.

The primary windings 112A are connected to AC input 110 to receive the low-frequency AC, and the secondary windings 112B are spaced-apart from the primary windings 112A. In operation, the low-frequency AC received by the primary windings 112A induces a low-frequency AC on the secondary windings 112B.

The magnitude of the low-frequency AC on the secondary windings 112B can be stepped up (increased) or stepped down (decreased) by varying the ratio of the number of turns in the primary windings 112A to the number of turns in the secondary windings 112B. In addition, transformer 112 provides the remainder of linear power supply 100, along with any attached electronic device, with electrical isolation from AC input 110.

Further, linear power supply 100 includes an output rectifier 114 that is connected to the secondary windings 112B of transformer 112, and a filter 116 that is connected to output rectifier 114. Output rectifier 114 can be implemented with a conventional rectifier circuit, such as a four-diode bridge rectifier that provides full-wave rectification or a single diode rectifier that provides half-wave rectification.

In the FIG. 1 example, output rectifier 114 is implemented as a four-diode bridge rectifier. Filter 116, in turn, is implemented with an LC circuit that includes an inductor L and a capacitor C. In operation, output rectifier 114 converts the low-frequency AC on the secondary windings 112B of transformer 112 into a DC voltage that is smoothed by filter 116 to generate a DC voltage VCC on an output 116G of filter 116.

Linear power supply 100 additionally includes a conductive line 120 that is connected to output 116G of filter 116, and an output connector 122 that is connected to conductive line 120 to receive the DC voltage VCC. Further, as shown in FIG. 1, a load 124, such as a portable electronic device, is connected to or disconnected from output connector 122 when load 232 is connected to or disconnected from linear power supply 100, respectively.

In operation, when output connector 122 is connected to load 124, the DC voltage VCC is input to load 124, causing a current IL to flow down conductive line 120 into load 124 to charge the battery, power the device, or both. When output connector 122 is disconnected from load 124, the current IL no longer flows down conductive line 120.

FIG. 2 shows a circuit diagram that illustrates an example of a prior-art switched-mode power supply (SMPS) 200. As shown in FIG. 2, SMPS 200 includes an AC input 210 that receives a low-frequency AC (e.g., 60 Hz), an input rectifier 212 that is connected to AC input 210, and a filter 214 that is connected to rectifier 212.

Input rectifier 212 can be implemented with a conventional rectification circuit, such as the four-diode bridge rectifier that provides full-wave rectification, or the single diode rectifier that provides half-wave rectification. In the FIG. 2 example, input rectifier 212 is implemented as a four-diode bridge rectifier. Filter 214, in turn, is implemented with a capacitor C. In operation, rectifier 212 converts the low-frequency AC into a DC voltage that is smoothed by filter 214.

As further shown in FIG. 2, SMPS 200 includes a chopper 216 that is connected to the output of filter 214. Chopper 216 can be implemented with a switch, such as a MOSFET. In operation, chopper 216 chops the smoothed DC voltage generated by filter 214 to generate a high-frequency AC (e.g., 10 KHz-100 KHz). (If chopper 216 can be connected to a DC voltage source, rectifier 212 and filter 214 can be omitted.)

SMPS 200 also includes a high-frequency transformer 220 that has primary windings 220A and secondary windings 220B. The primary windings 220A are connected to chopper 216 to receive the high-frequency AC, and the secondary windings 220B are spaced-apart from the primary windings 220A. The high-frequency AC received by the primary windings 220A induces a high-frequency AC on the secondary windings 220A. (A low-frequency transformer is larger than a high-frequency transformer of equivalent performance.)

As before, the magnitude of the high-frequency AC on the secondary windings can be stepped up (increased) or stepped down (decreased) by varying the ratio of the number of turns in the primary windings 220A to the number of turns in the secondary windings 220B. In addition, transformer 220 provides the remainder of SMPS 200, along with any attached electronic device, with electrical isolation from AC input 210.

Further, SMPS 200 includes an output rectifier 222 that is connected to the secondary windings 220B, and a filter 224 that is connected to output rectifier 222. Output rectifier 222 can be implemented with a conventional rectifier circuit, such as the four-diode bridge rectifier or the single diode rectifier. In the FIG. 2 example, output rectifier 222 is implemented as a four-diode bridge rectifier. Filter 224, in turn, is implemented with an LC circuit that includes an inductor L1 and a capacitor C2. In operation, output rectifier 222 converts the high-frequency AC on the secondary windings 220B into a DC voltage that is smoothed by filter 224 to generate a DC voltage VCC on an output 224G of filter 224.

SMPS 200 additionally includes a conductive line 226 that is connected to output 224G of filter 224, and an output connector 230 that is connected to conductive line 226 to receive the DC voltage VCC. Further, as shown in FIG. 2, a load 232, such as a portable electronic device, is connected to or disconnected from output connector 230 when load 232 is connected to or disconnected from SMPS 200, respectively.

In operation, when output connector 230 is connected to load 232, the DC voltage VCC is input to load 232, causing a current IL to flow down conductive line 226 into load 232 to charge the battery, power the device, or both. When output connector 230 is disconnected from load 232, the current IL no longer flows down conductive line 226.

In addition, SMPS 200 includes a chopper controller 234 that is connected to chopper 216 and conductive line 226. In operation, chopper controller 234 controls the switching frequency of chopper 216 (e.g., the rate at which the MOSFET turns on and off to chop up the smoothed DC voltage).

Further, chopper controller 226 compares the DC voltage VCC on conductive line 226 with a reference voltage, which can be internally generated, to determine whether the DC voltage VCC output to load 232 is within a specified limit. When the DC voltage VCC output to load 232 falls outside of the specified limit, chopper controller 234 adjusts the switching frequency of chopper 216 (e.g., the rate at which the MOSFET turns on and off) to generate a DC voltage that falls within the specified limit.

Chopper controller 234 needs power to operate before SMPS 200 can generate power. As a result, SMPS 200 also includes a chopper controller power supply 240 that provides power to operate chopper controller 234. In the FIG. 2 example, chopper controller power supply 240 is implemented with a linear power supply 242 that includes a transformer 242T that is connected to AC input 210, a rectifier 242R that is connected to transformer 242T, and a filter 242F that is connected to rectifier 242R to generate a DC voltage VDD. In operation, chopper controller power supply 240 continuously supplies the DC voltage VDD and a current to chopper controller 234 as long as the AC input 210 receives the low-frequency AC.

Linear power supply 242 is similar to linear power supply 100, except that rectifier 242R is implemented for exemplary purposes as a single diode rectifier, and linear power supply 242 is much smaller than linear power supply 100 because linear power supply 242 need only power chopper controller 234. Further, if the inductive load provided by the primary windings of transformer 242T of linear power supply 242 is too low, SMPS 200 can include a circuit 244 that lies between the primary windings and AC input 210. In the FIG. 2 example, circuit 244 is implemented with a capacitor, but can alternately be implemented with a resistor or a combination of a resistor and a capacitor.

One drawback of power supplies 100 and 200 is that power supplies 100 and 200 both continue to consume power after the load (the portable electronic device) has been disconnected. With linear power supply 100, even though load 124 has been disconnected, the low-frequency AC continues to be supplied to the primary windings 112A of transformer 112. The primary windings 112A of transformer 112, in turn, provide an inductive load which consumes reactive power even though load 124 has been disconnected.

With SMPS 200, even though load 232 has been disconnected, the high-frequency AC continues to be supplied to the primary windings 220A of transformer 220. The primary windings 220A of transformer 220, in turn, provide an inductive load which consumes reactive power even though load 232 has been disconnected.

Although the reactive power consumed by a single power supply when the load has been disconnected is not large, the cumulative affect of many millions of power supplies results in a significant waste of power on a national and global basis. As a result, there is a need for a power supply for portable electronic devices that reduces the power consumed when a load has been disconnected from the power supply.

DETAILED DESCRIPTION OF THE INVENTION

Figure 1:
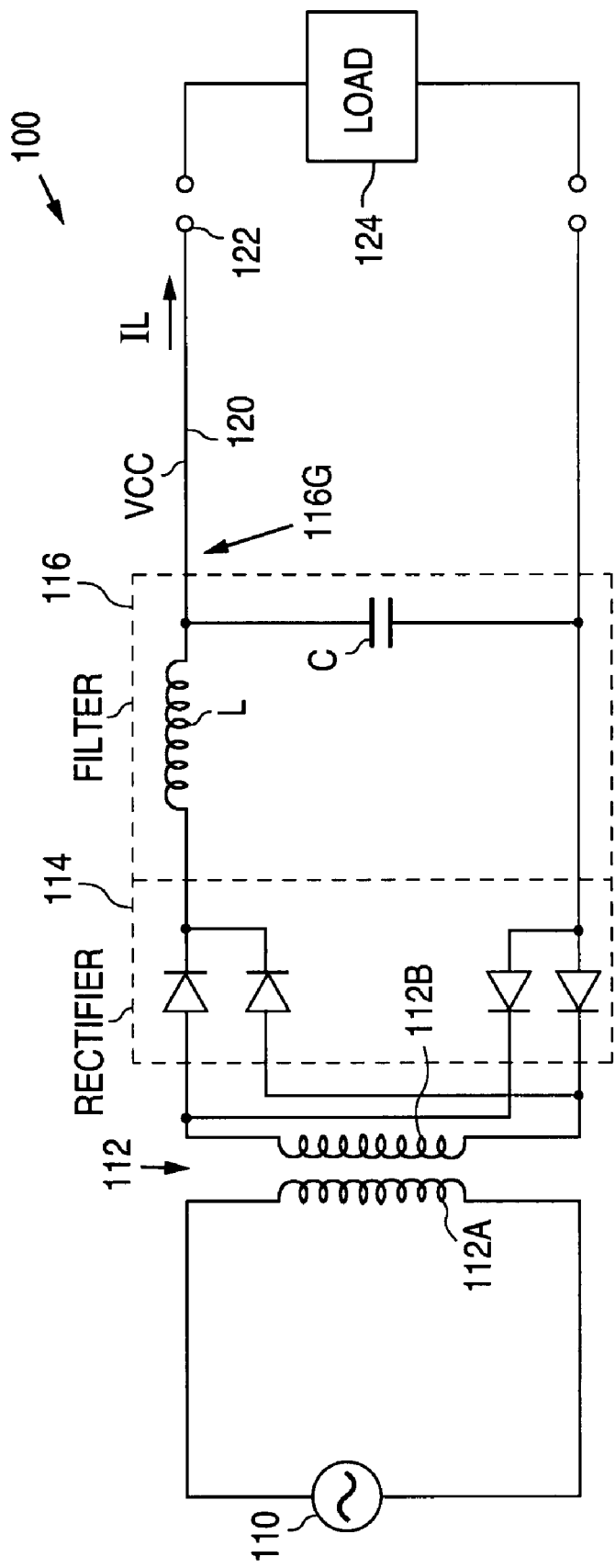
FIG. 1 is a circuit diagram illustrating an example of a prior-art linear power supply 100.
Figure 2:
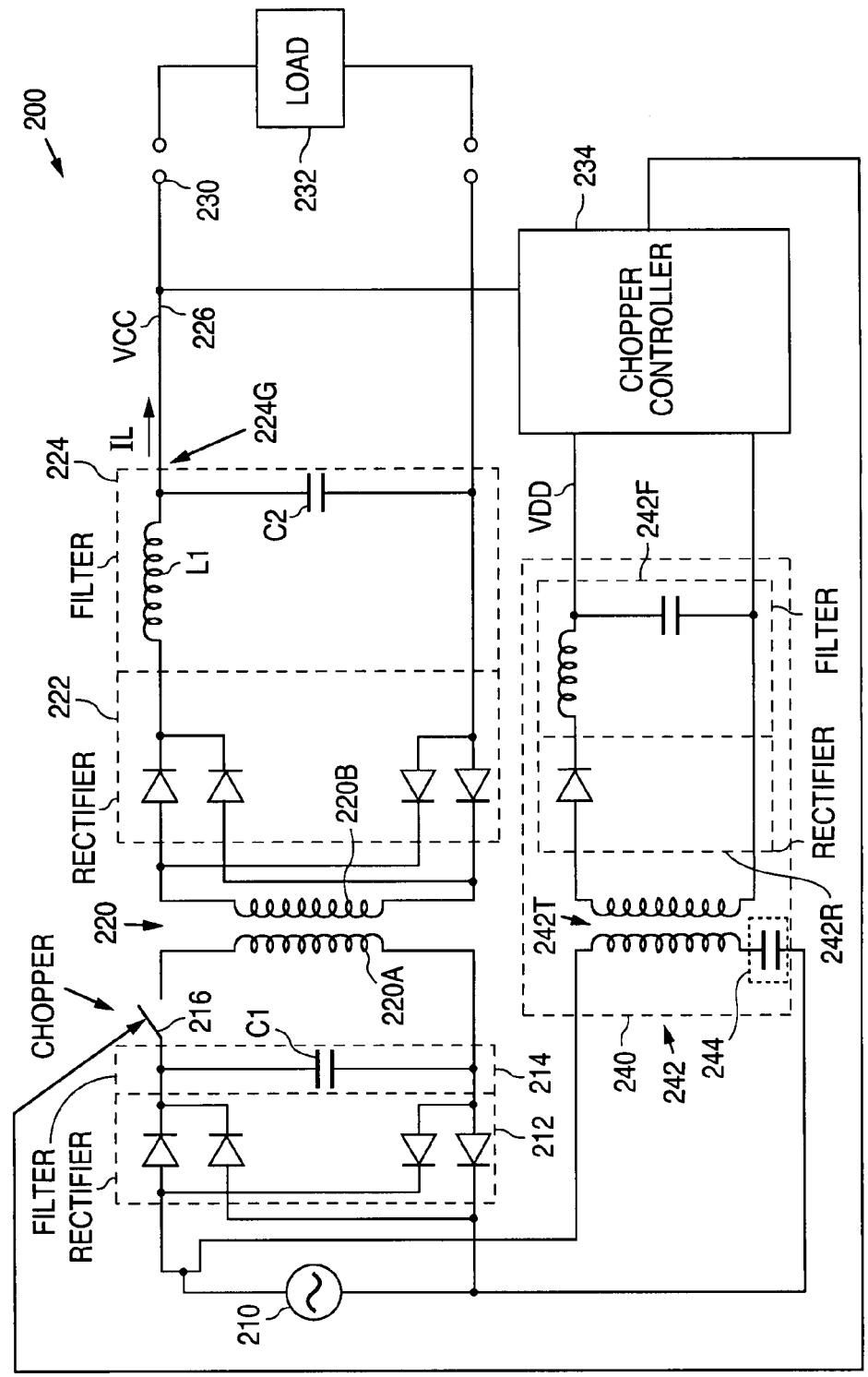
FIG. 2 is a circuit diagram illustrating an example of a prior-art switched-mode power supply (SMPS) 200.
Figure 3:
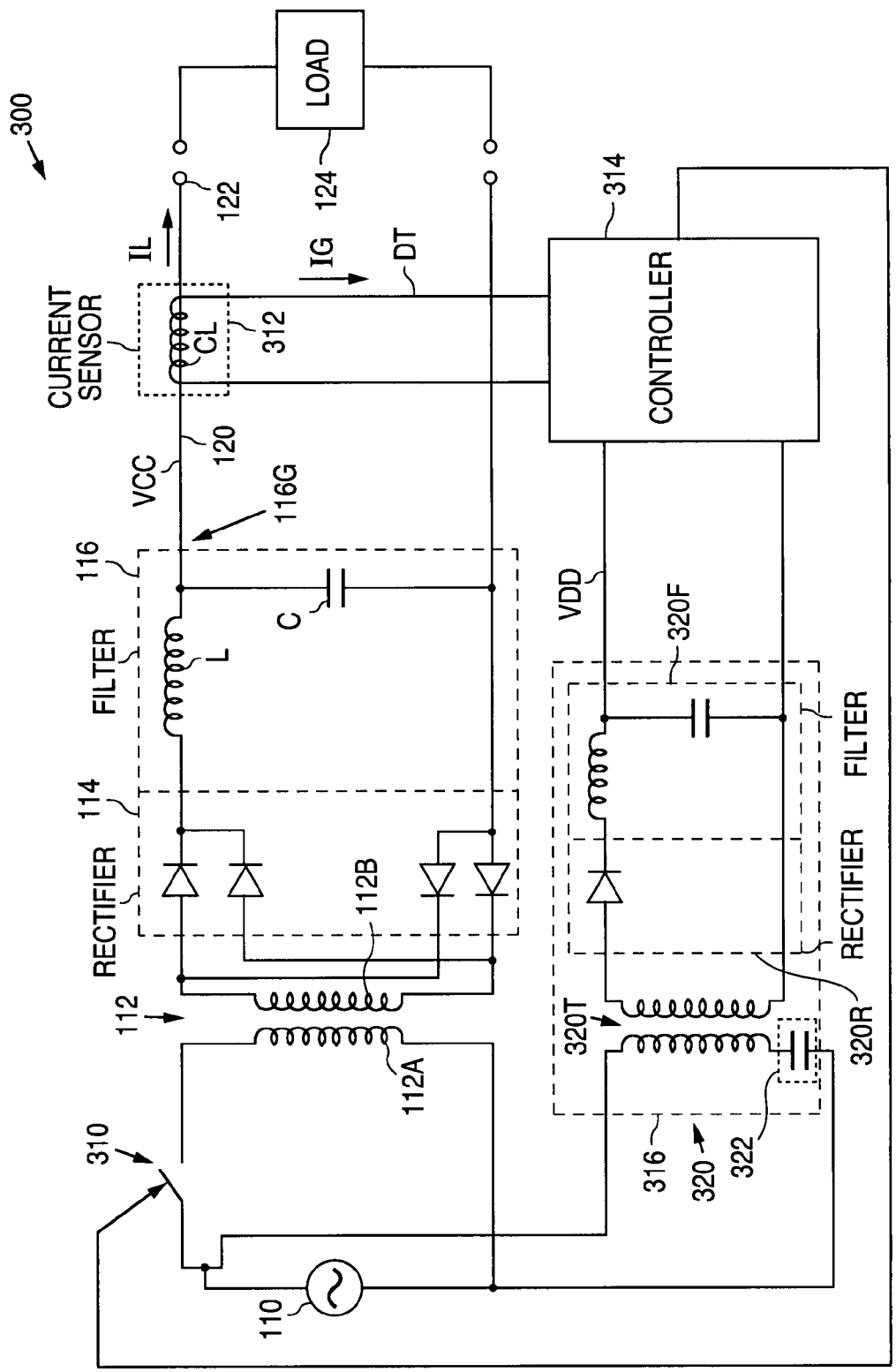
FIG. 3 is a circuit diagram illustrating an example of a linear power supply 300 in accordance with the present invention.

FIG. 3 shows a circuit diagram that illustrates an example of a linear power supply 300 in accordance with the present invention. As described in greater detail below, the power supplies of the present invention add detection and control circuitry to a conventional power supply to detect when the load has been disconnected and, when disconnected, interrupt the current path to the primary windings of the transformer, thereby substantially reducing the amount of reactive power that is consumed by the power supplies when the load has been disconnected.

Linear power supply 300 is similar to linear power supply 100 and, as a result, utilizes the same reference numerals to designate the structures which are common to both supplies. As shown in FIG. 3, linear power supply 300 differs from linear power supply 100 in that linear power supply 300 also includes a switch 310 that lies between and is connected to AC input 110 and the primary windings 112A of transformer 112. Switch 310 can be implemented with a MOSFET.

In addition, linear power supply 300 includes a current sensor 312 that detects the current IL that flows out of filter 116 and down conductive line 120, and outputs a detection signal DT that indicates a magnitude of the current IL that flows out of filter 116 and down conductive line 120. In the FIG. 3 example, current sensor 312 is implemented with a coil CL that is wrapped around conductive line 120, and outputs the detection signal DT as a current IG that flows out of the coil CL. When the current IL flows down conductive line 120, the current IL induces the current IG to flow out of the coil CL.

Linear power supply 300 further includes a controller 314 that is connected to switch 310 and current sensor 312. In operation, when switch 310 is closed and load 124 is connected to output connector 122 and consuming full power, load 124 draws the current IL. The current IL is detected by current sensor 312, which outputs the detection signal DT to indicate that the current IL is flowing with a magnitude that is greater than a minimum magnitude.

Controller 314 receives the detection signal DT from current sensor 312, such as by sensing a magnitude of the current IG that flows out of the coil CL. When the detection signal DT indicates that the current IL is flowing with a magnitude that is greater than the minimum magnitude, controller 314 ensures that switch 310 remains closed.

On the other hand, when load 124 is disconnected from linear power supply 300, the current IL no longer flows down conductive line 120. Current sensor 312 detects this condition, and outputs the detection signal DT to indicate that the magnitude of the current IL has fallen below the minimum magnitude.

Controller 314 receives the detection signal DT from current sensor 312, such as by detecting that the magnitude of the current IG that flows out of the coil CL has fallen below a minimum value. When the detection signal DT indicates that the magnitude of the current IL has fallen below the minimum magnitude, controller 314 outputs an open signal to switch 310 that causes switch 310 to open and remain open, thereby reducing the reactive power loss to zero.

In addition, to detect when load 124 has again been reconnected to linear power supply 300, controller 314 periodically outputs a close signal to switch 310 that causes switch 310 to close. If load 124 has not been reconnected to linear power supply 300, then no current IL will flow down conductive line 120 and the magnitude of the current IL will remain below the minimum magnitude.

Current sensor 312 detects this condition, and continues to indicate that the magnitude of the current IL is below the minimum magnitude via the detection signal DT. Controller 314 receives the detection signal DT from current sensor 312, such as by detecting that the magnitude of the current IG remains below the minimum value. When the detection signal DT indicates that the magnitude of the current IL remains below the minimum magnitude, controller 314 again outputs the open signal to switch 310 to cause switch 310 to open and remain open. On the other hand, when the detection signal DT again indicates that the current IL is flowing and greater than the minimum magnitude, controller 314 leaves switch 310 closed.

Thus, by opening switch 310 when load 124 is disconnected from linear power supply 300, and then periodically closing switch 310 to determine if load 124 has been reconnected to linear power supply 300, switch 310 is open most of the time that load 124 is disconnected from linear power supply 300, thereby substantially reducing the reactive power that is consumed by transformer 112.

Controller 314 needs power to operate when load 124 is disconnected. As a result, linear power supply 300 also includes a controller power supply 316 that provides power to operate controller 314. In the FIG. 3 example, controller power supply 316 is implemented with a linear power supply 320 that includes a transformer 320T that is connected to AC input 110, a rectifier 320R that is connected to transformer 320T, and a filter 320F that is connected to rectifier 320R to generate a DC voltage VDD.

Linear power supply 320 is similar to linear power supply 100, except that rectifier 320R is implemented for exemplary purposes as a single diode rectifier, and linear power supply 320 is much smaller than linear power supply 100 because linear power supply 320 need only power controller 314. Further, if the inductive load provided by the primary windings of transformer 320T of linear power supply 320 is too low, linear power supply 320 can include a circuit 322 that lies between the primary windings and AC input 110. In the FIG. 3 example, circuit 322 is implemented with a capacitor, but can alternately be implemented with a resistor or a combination of a resistor and a capacitor.

In operation, controller power supply 316 continuously supplies the DC voltage VDD and a current to controller 314 as long as the AC input 110 receives the low-frequency AC. Although controller power supply 316 continuously consumes reactive power, the amount is very small and the net result is a substantial reduction in the reactive power that is consumed when load 124 is disconnected from linear power supply 300.

Figure 4:
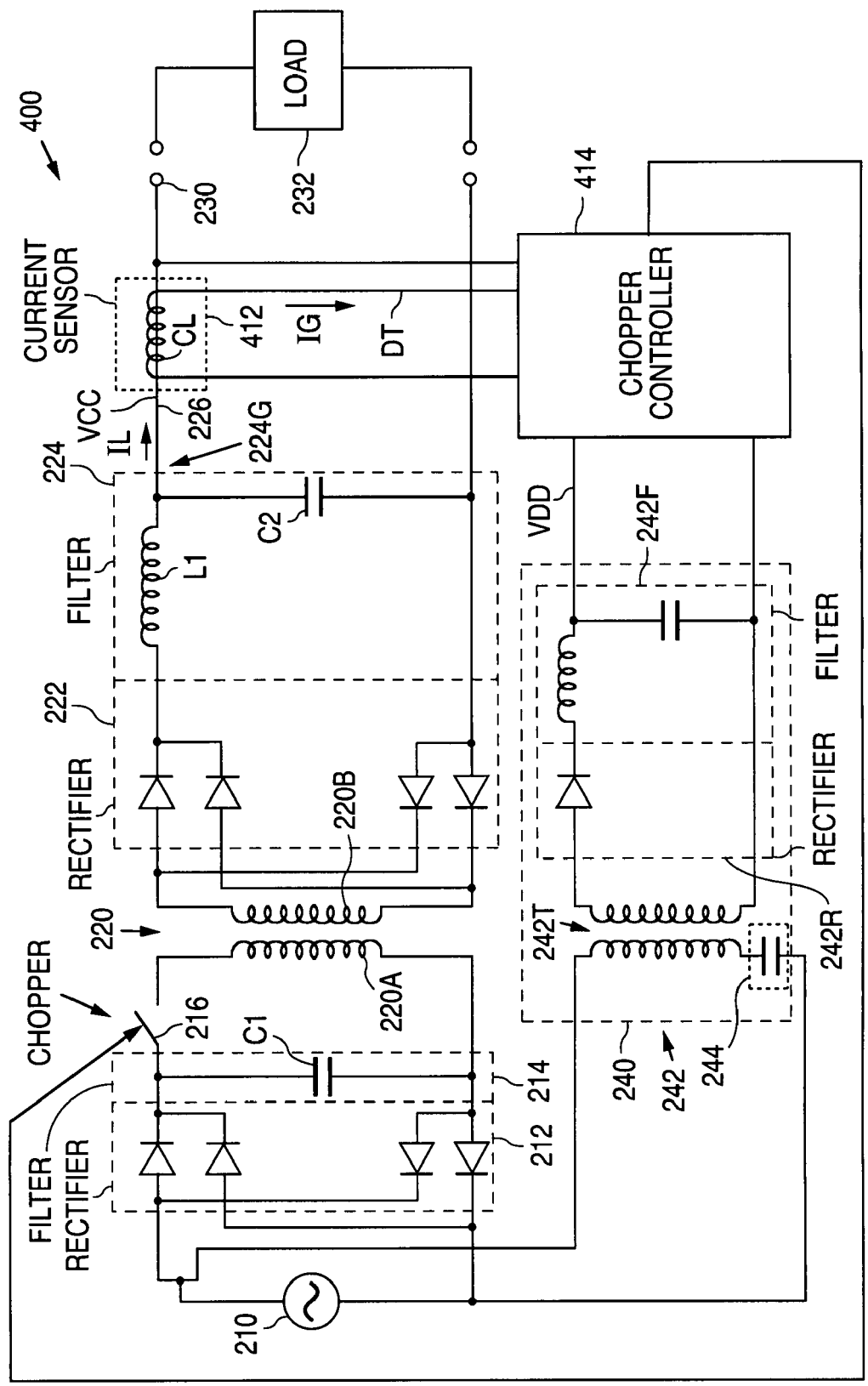
FIG. 4 is a circuit diagram illustrating an example of a switched-mode power supply (SMPS) 400 in accordance with the present invention.

FIG. 4 shows a circuit diagram that illustrates an example of a switched mode power supply (SMPS) 400 in accordance with the present invention. SMPS 400 is similar to SMPS 200 and, as a result, utilizes the same reference numerals to designate the structures which are common to both supplies.

As shown in FIG. 4, SMPS 400 differs from SMPS 200 in that SMPS 400 also includes a current sensor 412 that detects the current IL that flows out of filter 224 and down conductive line 226, and outputs a detection signal DT that indicates a magnitude of the current IL that flows out of filter 226 and down conductive line 226.

In the FIG. 4 example, current sensor 412 is implemented with a coil CL that is wrapped around conductive line 226, and outputs the detection signal DT as a current IG that flows out of the coil CL. When the current IL flows down conductive line 226, the current IL induces the current IG to flow out of the coil CL.

SMPS 400 further utilizes a chopper controller 414 in lieu of chopper controller 234. Chopper controller 414 is identical to chopper controller 234 except that chopper controller 414 is connected to current sensor 412 to receive and respond to the detection signal DT from current sensor 412. In operation, when chopper 216 is switching and generating the high-frequency AC and load 232 is connected to output connector 230 and consuming full power, load 232 draws the current IL.

The current IL is detected by current sensor 412, which outputs the detection signal DT to indicate that the current IL is flowing with a magnitude that is greater than a minimum magnitude. Chopper controller 414 receives the detection signal DT from current sensor 412, such as by sensing a magnitude of the current IG that flows out of the coil CL. When the detection signal DT indicates that the current IL is flowing with a magnitude that is greater than the minimum magnitude, chopper controller 414 ensures that chopper 216 continues switching and generating the high-frequency AC.

On the other hand, when load 232 is disconnected from SMPS 400, the current IL no longer flows down conductive line 226. Current sensor 412 detects this condition, and outputs the detection signal DT to indicate that the magnitude of the current IL has fallen below the minimum magnitude.

Chopper controller 414 receives the detection signal DT from current sensor 412, such as by detecting that the magnitude of the current IG that flows out of the coil CL has fallen below a minimum value. When the detection signal DT indicates that the magnitude of the current IL has fallen below the minimum magnitude, chopper controller 414 outputs a halt and open signal to chopper 216 that causes chopper 216 to stop switching, open, and remain open, thereby reducing the reactive power loss to zero.

In addition, to detect when load 232 has again been reconnected to SMPS 400, chopper controller 414 periodically outputs a resume signal to chopper 216 that causes chopper 216 to resume switching and generating the high-frequency AC. If load 232 has not been reconnected to SMPS 400, then no current IL will flow down conductive line 226 and the magnitude of the current IL will remain below the minimum magnitude.

Current sensor 412 detects this condition, and continues to indicate that the magnitude of the current IL is below the minimum magnitude via the detection signal DT. Chopper controller 414 receives the detection signal DT from current sensor 412, such as by detecting that the magnitude of the current IG remains below the minimum value.

When the detection signal DT indicates that the magnitude of the current IL remains below the minimum magnitude, chopper controller 414 again outputs the halt and open signal to chopper 216 to cause chopper 216 to stop switching, open, and remain open. On the other hand, when the detection signal DT again indicates that the current IL is flowing and greater than the minimum magnitude, chopper controller 414 leaves chopper 216 switching and generating the high-frequency AC.

Thus, by stopping chopper 216 in an open position when load 232 is disconnected from SMPS 400, and then periodically turning chopper 216 back on to determine if load 232 has been reconnected to SMPS 400, chopper 216 is primarily stopped and in an open position when load 232 is disconnected from SMPS 400, thereby substantially reducing the reactive power that is consumed by transformer 220. Although chopper controller power supply 240 continuously consumes reactive power, the amount is very small and the net result is a substantial reduction in the reactive power that is consumed when load 232 is disconnected from SMPS 400.

It should be understood that the above descriptions are examples of the present invention, and that various alternatives of the invention described herein may be employed in practicing the invention. Thus, it is intended that the following claims define the scope of the invention and that structures and methods within the scope of these claims and their equivalents be covered thereby.

What is claimed is:

1. A power supply comprising:
   a switch;
   a transformer having a primary winding and a secondary winding, the primary winding being connected to the switch;
   a rectifier connected to the secondary winding of the transformer;
   a filter connected to the rectifier; and
   a control circuit connected to the switch, the control circuit opening the switch only when the control circuit determines that no current is flowing out of the filter.

2. The power supply of claim 1 wherein the control circuit includes a controller and a current sensor connected to the controller, the current sensor detecting a current flowing out of the filter, the controller determining a current magnitude in response to the current detected by the current sensor.

3. The power supply of claim 1 wherein the control circuit closes the switch after a first predefined period of time, keeps the switch closed for a second predefined period of time, and opens the switch after the second predefined period of time only when the control circuit determines that no current is flowing out of the filter.

4. The power supply of claim 2 wherein the control circuit closes the switch after a first predefined period of time, keeps the switch closed for a second predefined period of time, and opens the switch after the second predefined period of time only when the control circuit determines that no current is flowing out of the filter.

5. The power supply of claim 4 and further comprising:
   an AC input connected to the switch, the AC input receiving a low-frequency AC; and
   a controller power supply connected to the AC input and the controller, the controller receiving an operating voltage and current from the controller power supply as long as the AC input receives the low-frequency AC.

6. A power supply comprising:
   a switch;
   a transformer having a primary winding and a secondary winding, the primary winding being connected to the switch;
   a rectifier connected to the secondary winding of the transformer;
   a filter connected to the rectifier; and
   a control circuit connected to the switch, the control circuit opening the switch only when the control circuit determines that a current flowing out of the filter has fallen below a minimum magnitude.

7. The power supply of claim 6 wherein the control circuit includes a controller and a current sensor connected to the controller, the current sensor detecting a current flowing out of the filter, the controller determining a current magnitude in response to the current detected by the current sensor.

8. The power supply of claim 6 wherein the control circuit closes the switch after a first predefined period of time, keeps the switch closed for a second predefined period of time, and opens the switch after the second predefined period of time only if the control circuit determines that any current flowing out of the filter remains below the minimum magnitude.

9. The power supply of claim 7 wherein the control circuit closes the switch after a first predefined period of time, keeps the switch closed for a second predefined period of time, and opens the switch after the second predefined period of time only if the control circuit determines that any current flowing out of the filter remains below the minimum magnitude.

10. The power supply of claim 9 and further comprising:
    an AC input connected to the switch, the AC input receiving a low-frequency AC; and
    a control circuit power supply connected to the AC input and the control circuit, the control circuit receiving an operating voltage and current from the control circuit power supply as long as the AC input receives the low-frequency AC.

11. A power supply comprising:
    a switch;
    a transformer having a primary winding and a secondary winding, the primary winding being connected to the switch;
    a rectifier connected to the secondary winding of the transformer;
    a filter connected to the rectifier; and
    a control circuit connected to the switch, the control circuit determining a difference between an output voltage at an output of the filter and a reference voltage, the control circuit opening and closing the switch at a switching frequency in response to the difference, the control circuit opening the switch for a predetermined period of time only when the control circuit determines that no current is flowing out of the filter, the predetermined period of time being greater than any period of the switching frequency.

12. The power supply of claim 11 wherein the control circuit includes a controller and a current sensor connected to the controller, the current sensor detecting a current flowing out of the filter, the controller determining a current magnitude in response to the current detected by the current sensor.

13. The power supply of claim 11 wherein, after the predetermined period of time, the control circuit closes and opens the switch at a switching frequency for a predefined time and, after the predefined time, opens the switch for the predetermined period of time only when the control circuit determines that no current is flowing out of the filter.

14. The power supply of claim 12 wherein, after the predetermined period of time, the control circuit closes and opens the switch at a switching frequency for a predefined time and, after the predefined time, opens the switch for the predetermined period of time only when the control circuit determines that no current is flowing out of the filter.

15. The power supply of claim 14 and further comprising:
    an AC input connected to the switch, the AC input receiving a low-frequency AC; and
    a control circuit power supply connected to the AC input and the control circuit, the control circuit receiving an operating voltage and current from the control circuit power supply as long as the AC input receives the low-frequency AC.

16. A power supply comprising:
    a switch;
    a transformer having a primary winding and a secondary winding, the primary winding being connected to the switch;
    a rectifier connected to the secondary winding of the transformer;
    a filter connected to the rectifier; and a control circuit connected to the switch, the control circuit determining a difference between an output voltage at an output of the filter and a reference voltage, the control circuit opening and closing the switch at a switching frequency in response to the difference, the control circuit opening the switch for a predetermined period of time only when the control circuit determines that a current flowing out of the filter has fallen below a minimum magnitude, the predetermined period of time being greater than any period of the switching frequency.

17. The power supply of claim 16 wherein the control circuit includes a controller and a current sensor connected to the controller, the current sensor detecting a current flowing out of the filter, the controller determining a current magnitude in response to the current detected by the current sensor.

18. The power supply of claim 16 wherein, after the predetermined period of time, the control circuit closes and opens the switch at a switching frequency for a predefined time and, after the predefined time, opens the switch for the predetermined period of time only when the control circuit determines that any current flowing out of the filter remains below the minimum magnitude.

19. The power supply of claim 17 wherein, after the predetermined period of time, the control circuit closes and opens the switch at a switching frequency for a predefined time and, after the predefined time, opens the switch for the predetermined period of time only when the control circuit determines that any current flowing out of the filter remains below the minimum magnitude.

20. The power supply of claim 19 and further comprising:
- an AC input connected to the switch, the AC input receiving a low-frequency AC; and
- a control circuit power supply connected to the AC input and the control circuit, the control circuit receiving an operating voltage and current from the control circuit power supply as long as the AC input receives the low-frequency AC.

* * * * *